(12) United States Patent
Zhang et al.

(10) Patent No.: US 10,110,692 B2
(45) Date of Patent: Oct. 23, 2018

(54) APPARATUS, SYSTEM AND METHOD FOR MTC

(71) Applicant: NEC Corporation, Tokyo (JP)

(72) Inventors: Xiaowei Zhang, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 49 days.

(21) Appl. No.: 15/039,224

(22) PCT Filed: Sep. 4, 2014

(86) PCT No.: PCT/JP2014/004561
§ 371 (c)(1),
(2) Date: May 25, 2016

(87) PCT Pub. No.: WO2015/079606
PCT Pub. Date: Jun. 4, 2015

(65) Prior Publication Data
US 2017/0026482 A1    Jan. 26, 2017

(30) Foreign Application Priority Data
Nov. 29, 2013 (JP) .................. 2013-247474

(51) Int. Cl.
H04L 29/08  (2006.01)
H04L 29/06  (2006.01)
(Continued)

(52) U.S. Cl.
CPC ...... H04L 67/2833 (2013.01); H04L 67/2814 (2013.01); H04L 67/2838 (2013.01);
(Continued)

(58) Field of Classification Search
CPC . H04L 45/16; H04L 67/2814; H04L 67/2833; H04L 67/2838; H04L 67/322; H04L 69/22; H04W 28/06; H04W 4/005
(Continued)

(56) References Cited

U.S. PATENT DOCUMENTS

2002/0097724 A1* 7/2002 Halme ................ H04L 67/1002
370/392
2003/0041163 A1* 2/2003 Rhoades ................... G06F 1/10
709/232
(Continued)

FOREIGN PATENT DOCUMENTS

EP    2 403 276 A1    1/2012

OTHER PUBLICATIONS

Jain, P. et al. "Machine Type Communications in 3GPP Systems." IEEE Communications Magazine, Nov. 2012, pp. 28-35.
(Continued)

Primary Examiner — Stephen J Clawson
(74) Attorney, Agent, or Firm — Foley & Lardner LLP

(57) ABSTRACT

In order for efficiently managing communications between a UE (10) and multiple SCSs (20_1-20_n), the UE (10) includes, in one message, multiple pieces of data to be transmitted to the SCSs (20_1-20_n), and sends the message to an MTC-IWF (30). The MTC-IWF (30) receives the message from the UE (10), and distributes the date to the SCSs (20_1-20_n). Each of the SCSs sends (20_1-20_n), to the MTC-IWF (30), data to be transmitted to the UE (10) and an indicator that indicates for the SCSs (20_1-20_n) the time tolerance until the data is transmitted to the UE (10). The MTC-IWF (30) receives the data and the indicators from the SCSs (20_1-20_n), and determines when to forward the data to the UE (10) based on the indicators.

8 Claims, 7 Drawing Sheets

(51) Int. Cl.
H04W 4/70 (2018.01)
H04L 12/761 (2013.01)
H04W 28/06 (2009.01)

(52) U.S. Cl.
CPC .............. *H04L 69/22* (2013.01); *H04W 4/70* (2018.02); *H04L 45/16* (2013.01); *H04L 67/322* (2013.01); *H04W 28/06* (2013.01)

(58) Field of Classification Search
USPC ........................................................ 370/312
See application file for complete search history.

(56) References Cited

U.S. PATENT DOCUMENTS

| | | | | |
|---|---|---|---|---|
| 2004/0221154 A1* | 11/2004 | Aggarwal | ............... | H04L 63/20 713/151 |
| 2009/0204666 A1 | 8/2009 | Sane et al. | | |
| 2012/0033613 A1* | 2/2012 | Lin | ..................... | H04W 74/085 370/328 |
| 2012/0087274 A1* | 4/2012 | Meriau | ................... | H04W 4/00 370/253 |
| 2012/0250501 A1* | 10/2012 | Lee | ..................... | H04W 76/007 370/229 |
| 2013/0083726 A1* | 4/2013 | Jain | ................... | H04W 28/0215 370/328 |

OTHER PUBLICATIONS

"Interaction of oneM2M with Underlying 3GPP2 Networks." TSG-SX Correspondence, 3GPP2, Sep. 13, 2013 (3 pgs.).
International Search Report and Written Opinion in PCT/JP2014/004561 dated Dec. 16, 2014 (9 pgs.).
3GPP TS 22.368. $3^{rd}$ Generation Partnership Project; Technical Specification Group Services and System Aspects; Service Requirements for Machine-Type Communications (MTC); Stage 1, Release 12,V.12.2.0, Mar. 2013.
3GPP TS 23.682. $3^{rd}$ Generation Partnership Project; Technical Specification Group Services and System Aspects; Architecture Enhancements to facilitate communications with packet data networks and applications, Release 11, V.11.5.0, Sep. 2013.
3GPP TS 29.368. $3^{rd}$ Generation Partnership Project; Technical Specification Group Core Network and Terminals; Tsp interface protocol between the MTC Interworking Function (MTC-IWF) and Service Capability Server (SCS), Release 11, V.11.4.0, Sep. 2013.
Catt, "Remove EN of Solution MME/SGSN Control of Trigger Load over T5 to MTC-IWF", 3GPP Draft, S2-132716, 3rd Generation Partnership Project, SA WG2 Meeting S2 #98, Jul. 2013 (3 pgs.).
Huawei et al. "Overview of Normative Changes for the Small Data Service", 3GPP Draft, S2-134199, 3rd Generation Partnership Project, SA WG2 Meeting #100, Nov. 2013 (8 pgs.).
Huawei et al. "Update of T5 Triggering", 3GPP Draft, S2-131003, 3rd Generation Partnership Project, SA WG2 Meeting #96, Apr. 2013 (4 pgs.).
3GPP TR 23.887 V.1.4.1. 3rd Generation Partnership Project; Technical Specification Group Services and System Aspects; Study on Machine-Type and other mobile data applications communications enhancements, Release 12, Nov. 2013 (154 pgs.).
Ericsson. "Secure Connection—Details on GBA Based Solutions." 3rd Generation Partnership Project, 3GPP TSG SA WG3 (Security) Meeting #73, S3-131054, Nov. 2013 (12 pgs.).
Extended European Search Report dated Apr. 20, 2018 in related European Appl. No. 18151685.7 (10 pgs.).
Office Action dated May 8, 2018 in related Japanese Appl. 2016-534262 with English-language translation (7 pgs.).

* cited by examiner

[Fig. 6]
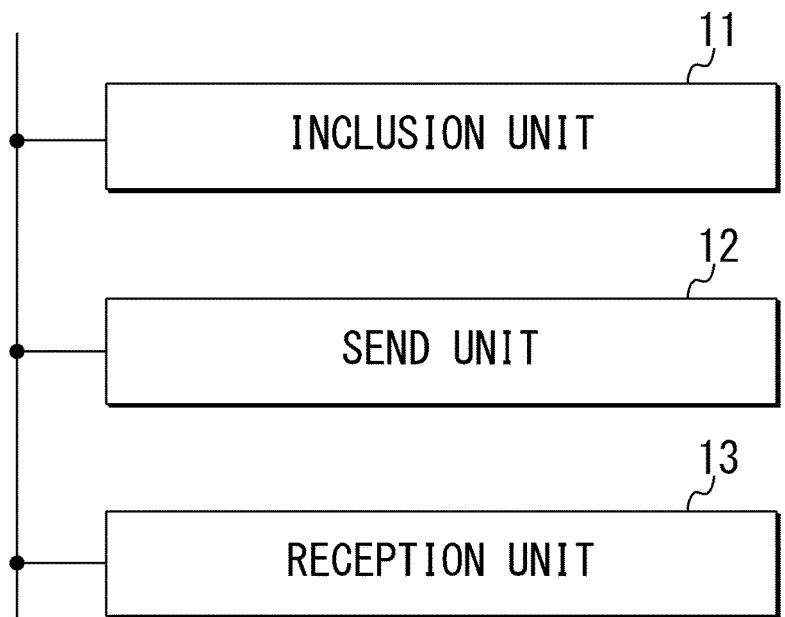
[Fig. 7]

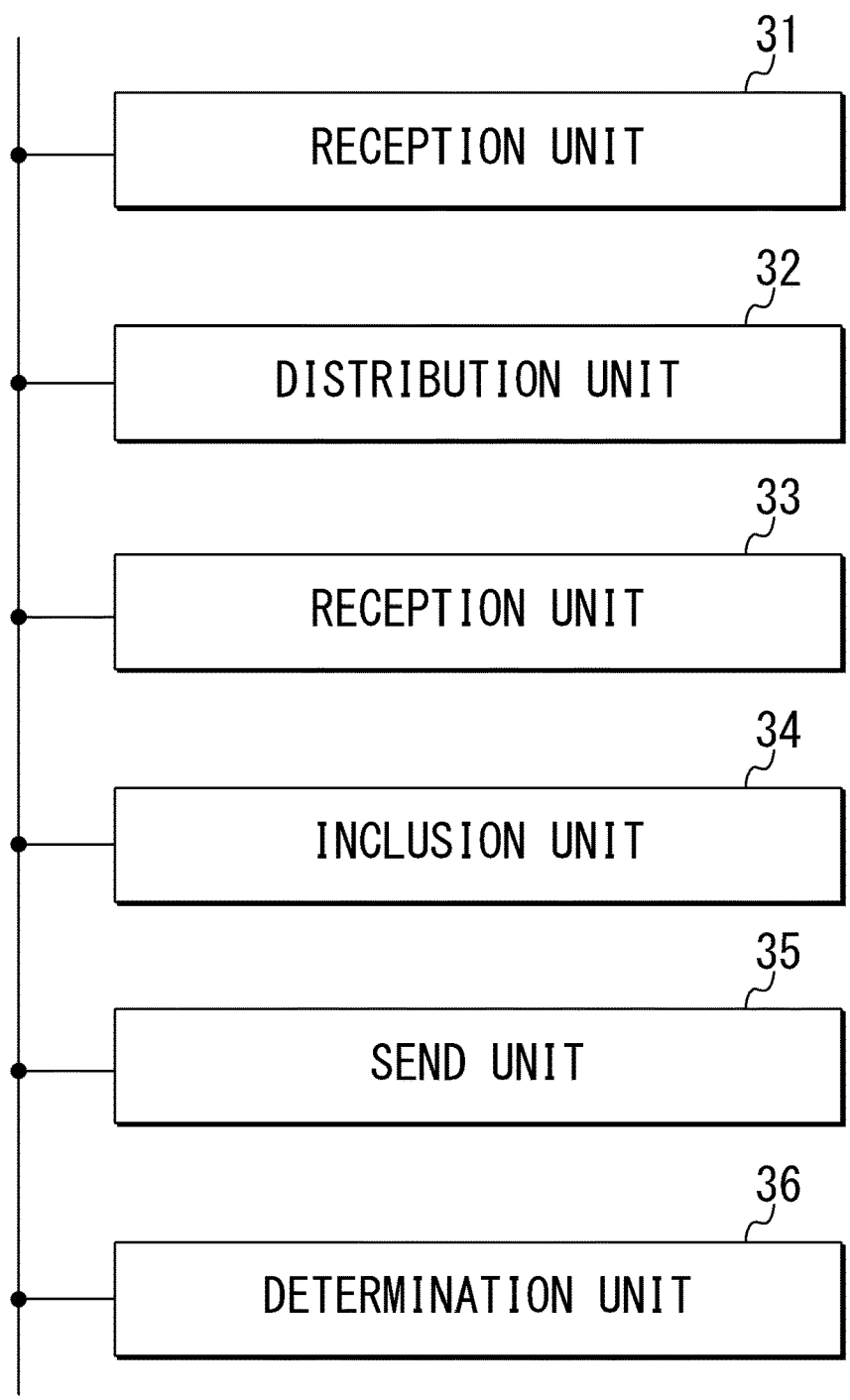
[Fig. 8]

APPARATUS, SYSTEM AND METHOD FOR MTC

TECHNICAL FIELD

The present invention relates to an apparatus, a system and a method for MTC (Machine-Type-Communication), and particularly to communications between a UE (User Equipment) and multiple SCSs (Service Capability Servers).

BACKGROUND ART

The architecture of MTC has been studied in 3GPP (3rd Generation Partnership Project). For example, NPLs 1 and 2 disclose typical MTC-IWF (MTC Inter-Working Function) and SCS. Moreover, NPL 3 discloses that an MTC device can communicate with one or more SCSs.

Note that the MTC device is a UE equipped for MTC and subscribed to MTC service, which will be sometimes referred to as "MTC UE" or "UE" in the following description.

CITATION LIST

Non Patent Literature

NPL 1: 3GPP TS 29.368, "Tsp interface protocol between the MTC Interworking Function (MTC-IWF) and Service Capability Server (SCS) (Release 11)", V11.4.0, 2013-09, Clauses 4.2.1 and 4.2.2, pp. 7-8
NPL 2: 3GPP TS 23.682, "Architecture enhancements to facilitate communications with packet data networks and applications (Release 11)", V11.5.0, 2013-09, Clause 4.4.2, pp. 12-13
NPL 3: 3GPP TS 22.368, "Service requirements for Machine-Type Communications (MTC); Stage 1 (Release 12)", V12.2.0, 2013-03, Clause 5.1.2, pp. 8-9

SUMMARY OF INVENTION

Technical Problem

As required in NPL 3, in MTC and service thereof, one UE may subscribe services from multiple SCSs and need to communicate with the SCSs.

However, the inventors of this application have found that there are several problems in this case. For example, one of the problems is that traffic from the UE to the MTC-IWF is increased with sending messages one by one. Another problem is that since every time the UE has to perform confidentiality and/or integrity protection for the message, it is power and time consuming.

Accordingly, an exemplary object of the present invention is to provide a solution for efficiently managing communications between a UE and multiple SCSs.

Solution to Problem

In order to achieve the above-mentioned object, an MTC device according to first exemplary aspect of the present invention includes: inclusion means for including, in one message, multiple pieces of data to be transmitted to a plurality of SCSs or ASs (Application Servers) that can communicate with the MTC device through a core network; and send means for sending the first message to an MTC-IWF that serves as an entering point in the core network for communications from the SCSs or the ASs.

Further, an MTC-IWF according to second exemplary aspect of the present invention serves as an entering point in a core network for communications from a plurality of SCSs or ASs that can communicate with an MTC device through the core network. This MTC-IWF includes: reception means for receiving, from the MTC device, one message that includes multiple pieces of data to be transmitted to the SCSs or the ASs; and distribution means for distributing the date to the SCSs or the ASs.

Further, an MTC-IWF according to third exemplary aspect of the present invention serves as an entering point in a core network for communications from a plurality of SCSs or ASs that can communicate with an MTC device through the core network. This MTC-IWF includes: reception means for receiving, from the SCSs or the ASs, multiple pieces of data to be transmitted to the MTC device, and indicators that indicate how long the SCSs or the ASs can tolerant until respective pieces of the data are transmitted to the MTC device; and determination means for determining when to forward the data to the MTC device based on the indicators.

Further, an SCS according to fourth exemplary aspect of the present invention can communicate with an MTC device through a core network. This SCS includes: send means for sending, to an MTC-IWF that serves as an entering point in the core network for communications from the SCS, and one or more different SCSs or ASs, data to be transmitted to the MTC device and an indicator that indicates how long the SCS can tolerant until the data is transmitted to the MTC device.

Further, a communication system according to fifth exemplary aspect of the present invention includes: an MTC device; a plurality of SCSs or ASs that can communicate with the MTC device through a core network; and an MTC-IWF that serves as an entering point in the core network for communications from the SCSs or the ASs. The MTC device includes, in one message, multiple pieces of data to be transmitted to the SCSs or the ASs, and sends the message to the MTC-IWF. The MTC-IWF receives the message from the MTC device, and distributes the date to the SCSs or the ASs.

Further, a communication system according to sixth exemplary aspect of the present invention includes: an MTC device; a plurality of SCSs or ASs that can communicate with the MTC device through a core network; and an MTC-IWF that serves as an entering point in the core network for the SCSs or the ASs. Each of the SCSs or the ASs sends, to the MTC-IWF, data to be transmitted to the MTC device and an indicator that indicates how long each of the SCSs or the ASs can tolerant until the data is transmitted to the MTC device. The MTC-IWF receives the data and the indicators from the SCSs or the ASs, and determines when to forward the data to the MTC device based on the indicators.

Further, a method according to seventh exemplary aspect of the present invention provides a method of controlling operations in an MTC device. This method includes: including, in one message, multiple pieces of data to be transmitted to a plurality of SCSs or ASs that can communicate with the MTC device through a core network; and sending the message to an MTC-IWF that serves as an entering point in the core network for communications from the SCSs or the ASs.

Further, a method according to eighth exemplary aspect of the present invention provides a method of controlling operations in an MTC-IWF that serves as an entering point in a core network for a plurality of SCSs or ASs that can communicate with an MTC device through the core network. This method includes: receiving, from the MTC device, one message that includes multiple pieces of data to be transmitted to the SCSs or the ASs; and distributing the date to the SCSs or the ASs.

Further, a method according to ninth exemplary aspect of the present invention provides a method of controlling operations in an MTC-IWF that serves as an entering point in a core network for communications from a plurality of SCSs or ASs that can communicate with an MTC device through the core network. This method includes: receiving, from the SCSs or the ASs, multiple pieces of data to be transmitted to the MTC device, and indicators that indicate how long the SCSs or the ASs can tolerant until respective pieces of the data are transmitted to the MTC device; and determining when to forward the data to the MTC device based on the indicators.

Furthermore, a method according to tenth exemplary aspect of the present invention provides a method of controlling operations in an SCS that can communicate with an MTC device through a core network. This method includes: sending, to an MTC-IWF that serves as an entering point in the core network for communications from the SCS, and one or more different SCSs or ASs, data to be transmitted to the MTC device and an indicator that indicates how long the SCS can tolerant until the data is transmitted to the MTC device.

Advantageous Effects of Invention

According to the present invention, it is possible to solve the above-mentioned problems, and thus to provide a solution for efficiently managing communications between a UE and multiple SCSs.

BRIEF DESCRIPTION OF DRAWINGS

FIG. 6 is a block diagram showing a configuration example of an MTC device according to the exemplary embodiment.

FIG. 7 is a block diagram showing a configuration example of an SCS according to the exemplary embodiment.

FIG. 8 is a block diagram showing a configuration example of an MTC-IWF according to the exemplary embodiment.

DESCRIPTION OF EMBODIMENTS

Hereinafter, an exemplary embodiment of an MTC device, an SCS and an MTC-IWF according to the present invention, and a communication system to which these MTC device, SCS and MTC-IWF are applied, will be described with the accompanying drawings.

In this exemplary embodiment, there will be proposed an efficient solution for an MTC-IWF to manage and transfer communications between a UE and multiple SCSs.

Figure 1:
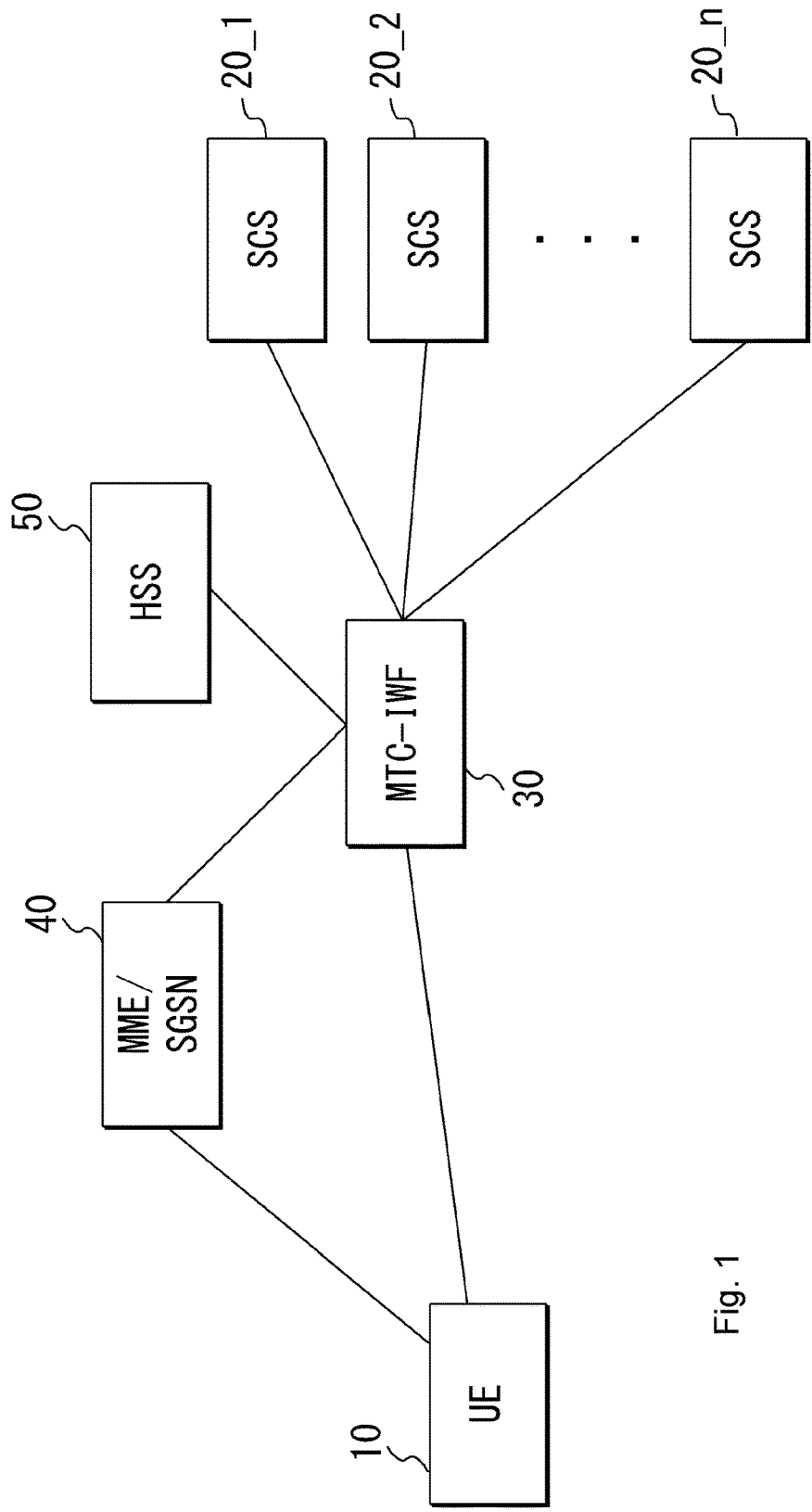
FIG. 1 is a block diagram showing a configuration example of a communication system according to an exemplary embodiment of the present invention.

As shown in FIG. 1, a communication system according to this exemplary embodiment includes a MTC UE 10, a core network, and a plurality of SCSs 20_1 to 20_n (which will be sometimes collectively denoted by the symbol 20).

The core network includes, as its network nodes, an MTC-IWF 30, an MME (Mobility Management Entity), an SGSN (Serving GPRS (General Packet Radio Service) Support Node), an HSS (Home Subscriber Server) 50 and the like. Note that although the illustration is omitted, the MTC UE 10 connects to the core network through a RAN (Radio Access Network), and the RAN is formed by a plurality of base stations (e.g., eNBs (evolved Node Bs)). The MME can relay traffic between the RAN and the MTC-IWF 30. The SGSN functions as with the MME. In the following description, the MME and/or the SGSN will be sometimes referred to as "MME/SGSN", and collectively denoted by the symbol 40. The HSS 50 manages subscription in-formation on the MTC UE 10, and the like.

The MTC UE 10 attaches to the core network through the RAN, thereby communicating with the SCS 20.

The SCS 20 connects to the core network to communicate with the MTC UE 10. The MTC UE 10 can host one or multiple MTC Applications. The corresponding MTC Applications in the external network are hosted on the SCS 20. Note that although the illustration is omitted, the communication system may include a plurality of ASs. As with the SCS 20, each AS can connect to the core network to communicate with the MTC UE 10. The MTC Applications can be also hosted on each AS. In the following description, explanations about the SCS 20 can be similarly applied to those about the AS.

The MTC-IWF 30 serves as an entering point in the core network for communication from the SCS 20. Typically, the MTC-IWF 30 transmits traffic between the MTC UE 10 and the SCS 20.

Next, operation example of this exemplary embodiment will be described in detail with reference to FIGS. 2 to 4.

1. Outbound Message

For outbound messages, the MTC UE 10 sends messages to different SCSs in one Data Transmission message. The Data Transmission message sent from the MTC UE 10 to the MTC-IWF 30 is confidentiality and/or integrity protected with the key shared between the MTC UE 10 and the MTC-IWF 30. The Data Transmission sent from the MTC-IWF 30 to the SCS 20 should have confidentiality and/or integrity protection, using the security between the MTC-IWF 30 and the SCS 20. The pay load to the SCS 20 is confidentiality protected with key shared between the MTC UE 10 and the SCS 20. The Data Transmission Ack should have integrity protection.

When the MTC-IWF 30 receives the message, the MTC-IWF 30 performs integrity check and deciphers the message. The MTC-IWF 30 will distribute the message to the target SCSs as per MTC UE request.

Figure 2:
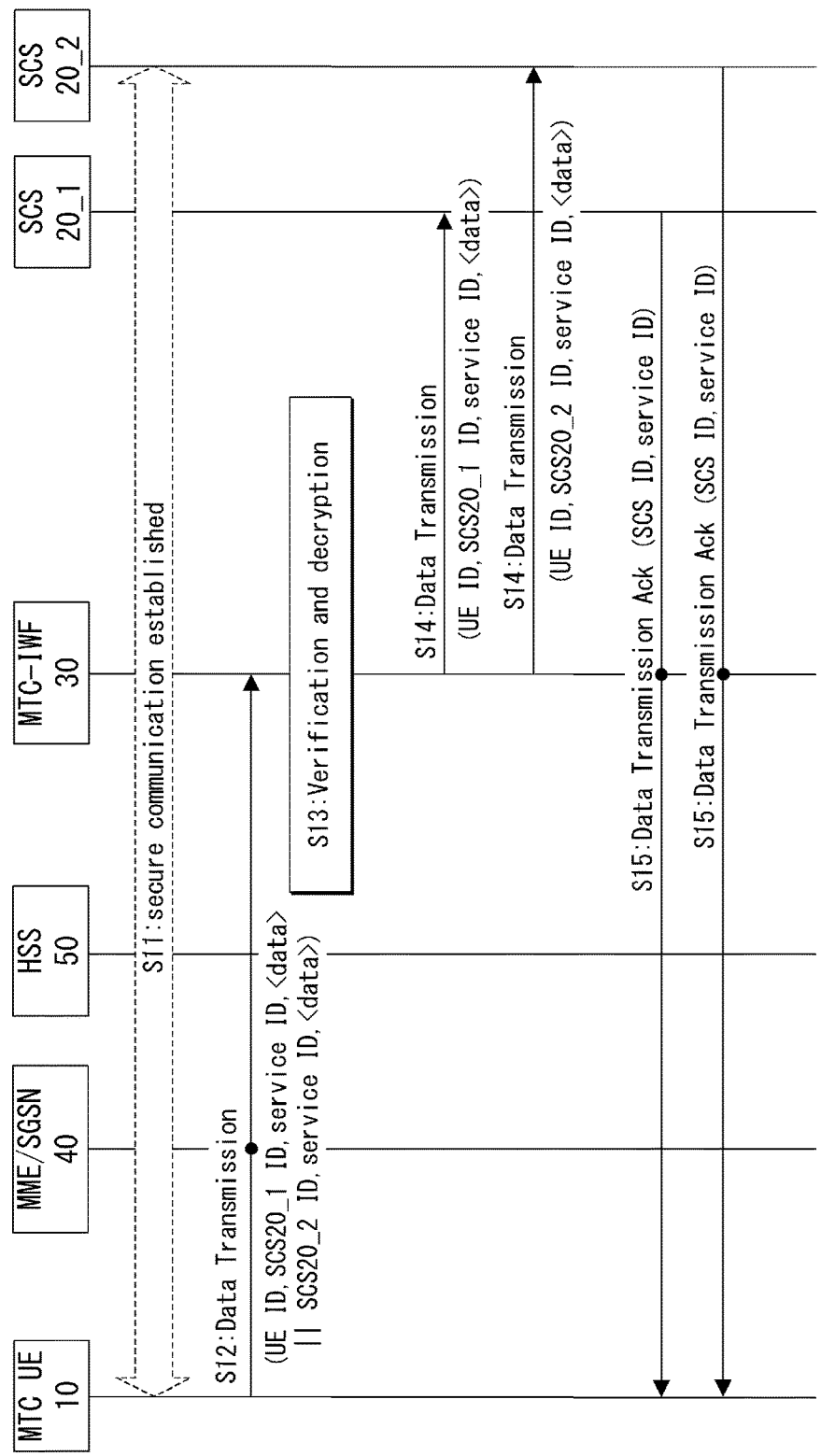
FIG. 2 is a sequence diagram showing a first example of operations in the communication system according to the exemplary embodiment.

Specifically, as shown in FIG. 2, assume that security is established between the MTC UE 10 and the core network, the MTC UE 10 and the MTC-IWF 30, and the MTC-IWF 30 and the SCS 20 (step S11).

The MTC UE 10 sends data, which the MTC UE 10 wants to send to different SCSs 20_1 and 20_2, in one message of Data Transmission to the MTC-IWF 30 (step S12). The MTC UE 10 encrypts the payload with the keys that the MTC UE 10 shared with the SCSs 20_1 and 20_2. The MTC UE 10 encrypts and/or integrity-protects the message with key that the MTC UE 10 shares with the MTC-IWF 30. The Data Transmission message can include IDs (identifiers) of the SCSs 20_1 and 20_2 (hereinafter, referred to as "SCS IDs"). In a case where at least one of the SCSs 20_1 and 20_2 provides multiple MTC services, the Data Transmission message can further include IDs of the MTC services (hereinafter, referred to as "service IDs").

The MTC-IWF 30 performs verification and decryption of the message, using the keys that shared between the MTC UE 10 and the MTC-IWF 30 (step S13).

According to the SCS ID in the Data Transmission message, the MTC-IWF 30 can send the payload to the correct target SCS (step S14). In the case where the service ID is included in the Data Transmission message, the MTC-IWF 30 can also send the payload to the correct target SCS according to the service ID.

Each of the SCSs 20_1 and 20_2 will send a Data Transmission Ack (acknowledgement) to the MTC-IWF 30. Then, the MTC-IWF 30 can forward the Data Transmission Ack messages to the MTC UE 10, separately (step S15).

In the operations shown in FIG. 2, multiple pieces of data to different SCSs are transmitted in one message. Therefore, it is possible to reduce battery consumption of the MTC UE and network resources required for transmitting the outbound messages.

Figure 3:
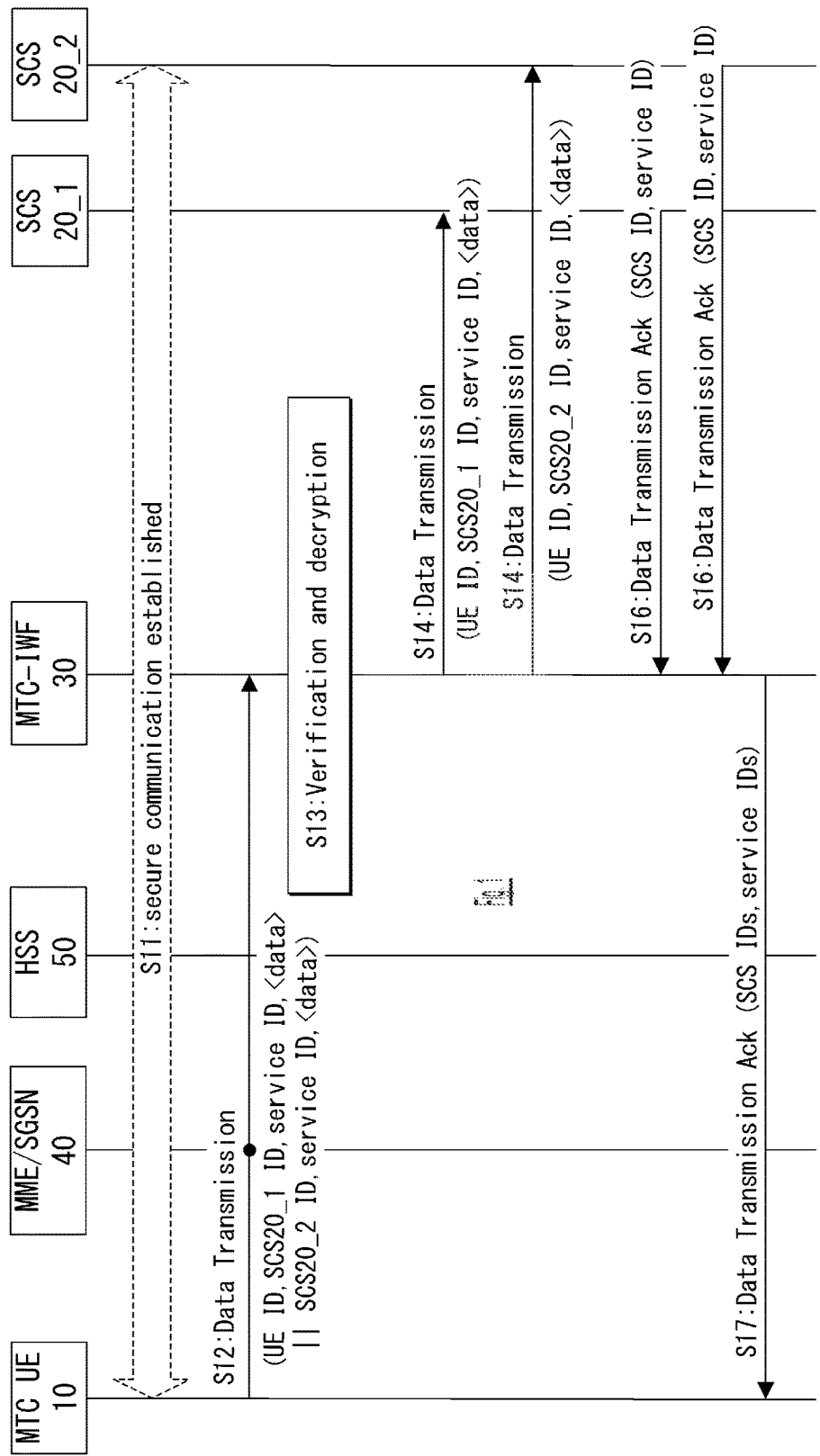
FIG. 3 is a sequence diagram showing a second example of operations in the communication system according to the exemplary embodiment.

As substitutes for the operations at above step S15, the communication system can perform operations as shown in FIG. 3.

Specifically, when the MTC-IWF 30 receives the Data Transmission Ack messages from the SCSs 20_1 and 20_2 (step S16), the MTC-IWF 30 needs not to immediately forward the Ack messages to the MTC UE 10.

Thus, the MTC-IWF 30 can hold the Ack messages to the same MTC UE 10, till before the timer for the MTC UE 10 to re-send the Data Transmission message to the SCS 20 (step S17). The timer should be synchronized in the MTC-IWF 30 and the MTC UE 10. For example, the MTC-IWF 30 starts the timer when the MTC-IWF 30 received the Data Transmission message from the MTC UE 10. Alternatively, the MTC UE 10 can also send the timer to the MTC-IWF 30 in the Data Transmission message.

In the operations shown in FIG. 3, a plurality of acknowledgements from different SCSs are transmitted in one message. Therefore, it is also possible to reduce battery consumption of the MTC UE and network resources required for transmitting the inbound messages.

2. Inbound Message

For inbound messages, some intelligence is needed for the MTC-IWF 30. When the MTC-IWF 30 knows that the target UE subscribes services from multiple SCSs, the MTC-IWF 30 can wait till more messages come when there is no emergency case, and then send the messages in one Data Transmission message. This requires the SCS 20 indicates a delivery tolerance time of the message to the MTC-IWF 30. If the tolerance timer shows that the data has to be transmitted immediately, the MTC-IWF 30 can forward the Data Transmission in the short tolerance timer order.

The Data Transmission sent from the SCS 20 to the MTC-IWF 30 should have confidentiality and/or integrity protection. The Data Transmission sent from the MTC-IWF 30 to the MTC UE 10 should have confidentiality and/or integrity protection. The payload should have confidentiality protection with the keys shared between the MTC UE 10 and the SCS 20. The Data Transmission Ack should have integrity protection.

Figure 4:
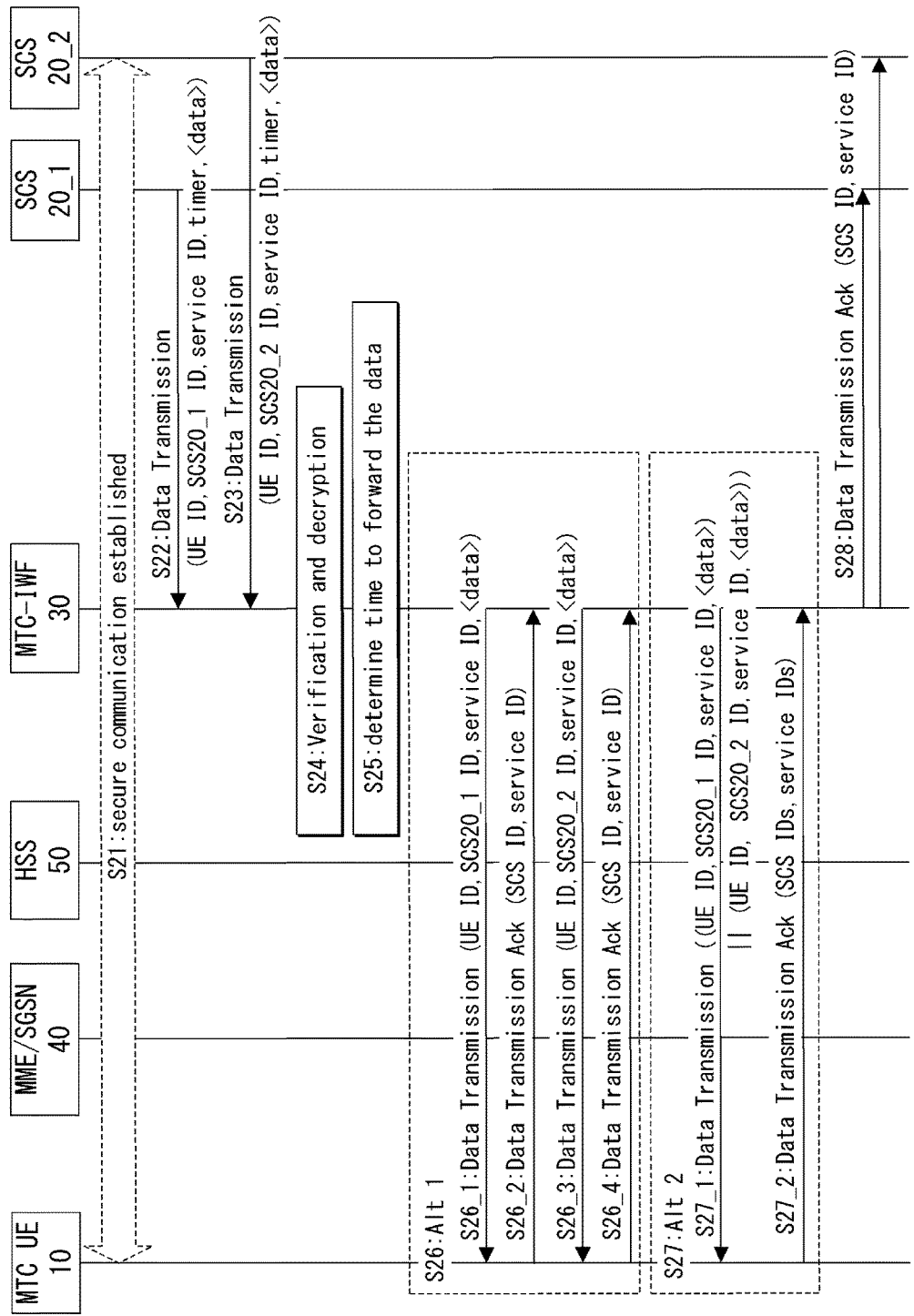
FIG. 4 is a sequence diagram showing a third example of operations in the communication system according to the exemplary embodiment.

Specifically, as shown in FIG. 4, assume that security is established between the MTC UE 10 and the core network, the MTC UE 10 and the MTC-IWF 30, and the MTC-IWF 30 and the SCS 20 (step S21).

The SCS 20_1 sends the Data Transmission to the MTC-IWF 30 (step S22). The SCS 20_1 encrypts the payload with the keys that the SCS 20_1 shared with the MTC UE 10. The SCS 20_1 encrypts and/or integrity-protects the message with key that the SCS 20_1 shares with the MTC-IWF 30.

The SCS 20_2 sends the Data Transmission to the MTC-IWF (step S23). The SCS 20_2 encrypts the payload with the keys that the SCS 20_2 shared with the MTC UE 10. The SCS 20_2 encrypts and/or integrity-protects the message with key that the SCS 20_2 shares with the MTC-IWF 30.

The MTC-IWF 30 performs verification and decryption of the messages, using the keys that the MTC-IWF 30 shared with the SCSs 20_1 and 20_2.

According to the tolerant timer that each of the SCSs 20_1 and 20_2 indicated in the Data Transmission, the MTC-IWF can send the Data Transmission separately (step S26) or in one message (step S27).

Examples of the tolerant timer include:
the timer can have exact how long the SCS 20 can be tolerant (can wait), e.g., 60 seconds, 2 minutes, etc.; or
the timer can indicate a level, e.g., low, medium, high, then the MTC-IWF 30 will determine when to forward the message to the MTC UE 10 according to the network traffic condition.

At step S26, according to the SCS ID in the Data Transmission message, the MTC-IWF 30 sends the Data Transmission from the SCS 20_1 to the MTC UE 10 (step S26_1).

The MTC UE 10 responds with Data Transmission Ack (step S26_2).

According to the SCS ID in the Data Transmission message, the MTC-IWF 30 sends the Data Transmission from the SCS 20_2 to the MTC UE 10 (step S26_3).

The MTC UE 10 responds with Data Transmission Ack (step S26_4).

Note that the Data Transmission Acks at steps S26_2 and S26_4 can also be sent in one message, as with step S12 respectively shown in FIGS. 2 and 3.

Alternatively, at step S27, if the tolerant timer allows, the MTC-IWF 30 can forward the data in one Data Transmission message to the MTC UE 10 (step S27_1).

The MTC UE 10 responds with Data Transmission Ack (step S27_2).

Then, the MTC-IWF 30 forwards the Data Transmission Ack to the SCSs 20_1 and 20_2, separately (step S28).

In the operation at step S27, multiple pieces of data from different SCSs to the MTC UE are transmitted in one message. Therefore, it is possible to reduce battery consumption of the MTC UE and network resources required for transmitting the inbound messages.

Next, a business model use case to which the communication system is applied will be described with reference to FIG. 5.

Figure 5:
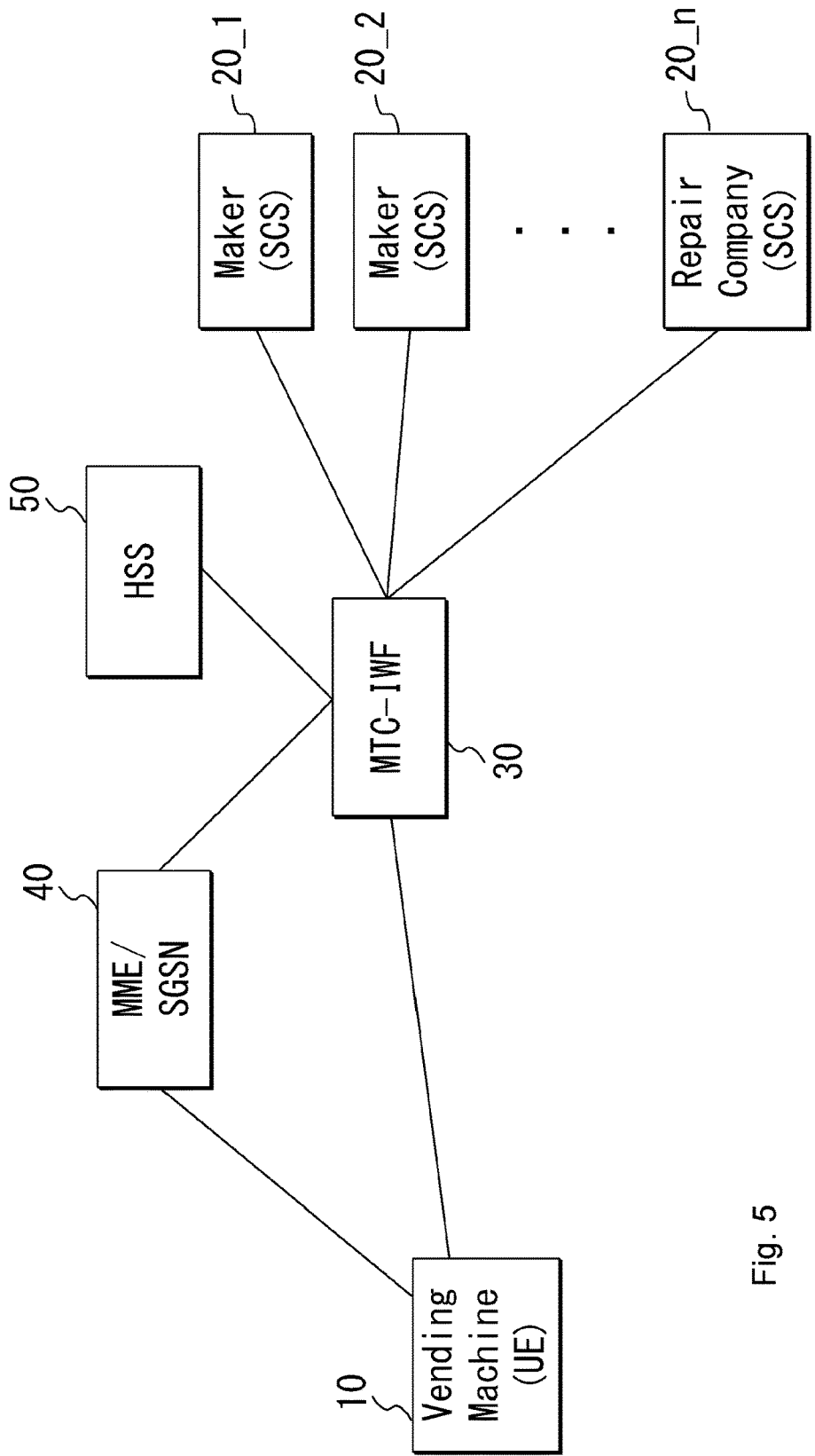
FIG. 5 is a block diagram showing a business model use case to which the communication system according to the exemplary embodiment is applied.

In an example shown in FIG. 5, the MTC UE 10 is a vending machine. The SCSs 20_1 and 20_2 are operated by makers which manufacture products to be sold by the vending machine. For example, the vending machine can be opened and be a platform that shared by different beverage companies. In this case, the vending machine can report to the beverage companies, for real time market analysis.

Nowadays, it is seen very common that the vending machines are run by one company. Multiple companies share the same vending machine, thereby can reduce their cost and also possibly shorten the supply chain. In other words, the beverage companies can just focus on what they do—making drinks.

Moreover, the SCS $20\_n$ is operated by a repair company which repairs the vending machine. The vending machine can report to the repair company in case of anything goes wrong.

Although the illustration is omitted, one of the remaining SCSs may be operated by an electric power company which delivers electricity to the vending machine. In this case, the vending machine can contact with the electric power company.

Meanwhile, this use case is only an example, and the idea can be extended to other use cases.

Note that the operators do not need to maintain the MTC-IWF 30. The MTC-IWF 30 can be owned and run by a 3rd party, such that operator can reduce their cost.

Next, configuration examples of the MTC UE 10, the SCS 20 and the MTC-IWF 30 will be described with reference to FIGS. 6 to 8. Note that in the following explanation, there will be described only elements which specific to this exemplary embodiment. However, it will be understood that the MTC UE 10, the SCS 20 and the MTC-IWF 30 also include elements for functioning as typical MTC UE, SCS and MTC-IWF, respectively.

As show in FIG. 6, the MTC UE 10 includes at least an inclusion unit 11 and a send unit 12. As shown at step S12 in respective FIGS. 2 and 3, the inclusion unit 11 includes, in one Data Transmission message, multiple pieces of data to be transmitted to the SCSs $20\_1$ to $20\_n$. Further, the inclusion unit 11 can includes the SCS ID and the service ID in the Data Transmission message. Furthermore, the inclusion unit 11 can includes, in the Data Transmission message, a value of the timer for the MTC UE 10 to re-send the Data Transmission message to the SCS 20. On the other hand, the send unit 12 sends the Data Transmission message to the MTC-IWF 30. In addition, the MTC UE 10 can include a reception unit 13. As shown at step S17 in FIG. 3, the reception unit 13 receives, from the MTC-IWF, the Data Transmission Ack message in which the Ack messages from the SCSs $20\_1$ to $20\_n$ are included. Note that these units 11 to 13 are mutually connected with each other through a bus or the like. These units 11 to 13 can be configured by, for example, a transceiver which conducts communication with the MTC-IWF 30 through the RAN, and a controller such as a CPU (Central Processing Unit) which controls this transceiver.

As show in FIG. 7, the SCS 20 includes a send unit 21. As shown at steps S22 and S23 in FIG. 4, the send unit 21 sends, to the MTC-IWF 30, the data to be transmitted to the MTC UE 10, and the above-mentioned tolerant timer or level. This send unit 21 can be configured by, for example, a transceiver which conducts communication with the MTC-IWF 30, and a controller such as a CPU which controls this transceiver.

As show in FIG. 8, for the outbound messages, the MTC-IWF 30 includes at least a reception unit 31 and a distribution unit 32. As shown at step S12 in respective FIGS. 2 and 3, the reception unit 31 receives the Data Transmission message from the MTC UE 10. As shown at step S14 in respective FIGS. 2 and 3, the distribution unit 32 distributes, to the SCSs $20\_1$ to $20\_n$, multiple pieces of data included in this Data Transmission message. Moreover, the distribution unit 32 can distinguish the SCSs to which the multiple pieces of data should be transmitted, by means of the SCS ID and the service ID. In addition, the MTC-IWF 30 can include a reception unit 33, an inclusion unit 34, and a send unit 35. As shown at step S16 in FIG. 3, the reception unit 33 receives, from the SCSs $20\_1$ to $20\_n$, a plurality of acknowledgements of the data. As shown at step S17, the inclusion unit 34 includes the acknowledgements in the Data Transmission Ack message, and the send unit 35 sends the Data Transmission Ack message to the MTC UE 10. For the inbound messages, the MTC-IWF 30 includes a determination unit 36. As shown at steps S22 and S23 in FIG. 4, the reception unit 33 receives, from the SCSs $20\_1$ to $20\_n$, multiple pieces of data to be transmitted to the MTC UE 10, and the above-mentioned tolerant timer or level. As shown at step S25, the determination unit 36 determines when to forward the data to the MTC UE 10 based on the tolerant timer or level. If the tolerant timer or level allows, as shown at step S27, the inclusion unit 34 includes the data in one Data Transmission message, and the send unit 35 sends this Data Transmission message to the MTC UE 10. On the other hand, if the tolerant timer or level does not allow, as shown at step S26, the send unit 35 individually sends the data to the MTC UE 10. Note that these units 31 to 36 are mutually connected with each other through a bus or the like. These units 31 to 36 can be configured by, for example, a transceiver which conducts communication with the MTC UE 10 through the RAN, a transceiver which conducts communication with the SCS 20, and a controller such as a CPU which controls these transceivers.

Note that the present invention is not limited to the above-mentioned exemplary embodiment, and it is obvious that various modifications can be made by those of ordinary skill in the art based on the recitation of the claims.

The whole or part of the exemplary embodiment disclosed above can be described as, but not limited to, the following supplementary notes.

(Supplementary Note 1)
UE includes data to different SCSs in one message, to reduce UE battery consumption and network resource.

(Supplementary Note 2)
UE indicates the SCS ID and service ID in the Data Transmission, such that MTC-IWF can distinguish to which SCS it should transfer.

(Supplementary Note 3)
MTC-IWF distributes the data transmission to different target SCSs.

(Supplementary Note 4)
SCS indicates a tolerant timer in the data transmission message, such that MTC-IWF can determine whether the data should be transmitted to UE immediately or it can transmit payload from more than SCSs to target UE.

(Supplementary Note 5)
The intelligence of MTC-IWF delivering data to and from different UEs or SCSs can reduce network traffic.

This application is based upon and claims the benefit of priority from Japanese patent application No. 2013-247474, filed on Nov. 29, 2013, the disclosure of which is incorporated herein in its entirety by reference.

REFERENCE SIGNS LIST

10 MTC UE
11, 34 INCLUSION UNIT
12, 21, 35 SEND UNIT
13, 31, 33 RECEPTION UNIT
20, $20\_1$-$20\_n$ SCS
30 MTC-IWF
32 DISTRIBUTION UNIT
36 DETERMINATION UNIT
40 MME/SGSN
50 HSS

The invention claimed is:

1. A system for a mobile communication, comprising:
    a UE (User Equipment);
    an MME (Mobility Management Entity) or an SGSN (Serving GPRS Support Node);
    multiple SCS (Service Capability server); and
    a node that connects to the multiple SCSs;
    wherein each of the multiple SCSs sends a message including UE ID, data and a tolerance time to the node,
    the node waits to deliver the data to the UE based on the tolerance time, and
    the node delivers the data to the UE via the MME or the SGSN.

2. A method of a mobile communication system, comprising:
    sending, by each of multiple SCS (Service Capability server)), a message including UE ID, data and a tolerance time to a node;
    waiting, by the node, to deliver the data to the UE based on the tolerance time; and
    delivering, by the node, the data to the UE via an MME (Mobility Management Entity) or an SGSN (Serving GPRS Support Node).

3. The method of claim 2, wherein the data is confidentiality and/or integrity protected.

4. The method of claim 2, wherein the UE and the multiple SCSs protect the data by using a shared key.

5. A node in a mobile communication system, comprising:
    a receiver configured to receive a message including UE (User Equipment) ID, data and a tolerance time from each of multiple SCS (Service Capability server);
    a sender configured to deliver the data to the UE via an MME (Mobility Management Entity) or an SGSN (Serving GPRS Support Node); and
    a controller configured to wait to deliver the data based on the tolerance time.

6. A method of a node in a mobile communication system, comprising:
    receiving a message including UE (User Equipment) ID, data and a tolerance time from each of multiple SCS (Service Capability server);
    delivering the data to the UE via an MME (Mobility Management Entity) or an SGSN (Serving GPRS Support Node); and
    waiting to deliver the data based on the tolerance time.

7. The method of claim 6, wherein the data is confidentiality and/or integrity protected.

8. The method of claim 6, wherein the UE and the multiple SCSs protect the data by using a shared key.

* * * * *